(12) United States Patent
Pang

(10) Patent No.: US 9,950,727 B1
(45) Date of Patent: Apr. 24, 2018

(54) MULTI-FUNCTIONAL FOLDING CART

(71) Applicant: QINGDAO ZHENGTAO TOOL CO., LTD., Qingdao (CN)

(72) Inventor: Wei Pang, Qingdao (CN)

(73) Assignee: QINGDAO ZHENGTAO TOOL CO., LTD., Qingdao (CN)

( * ) Notice: Subject to any disclaimer, the term of this patent is extended or adjusted under 35 U.S.C. 154(b) by 0 days.

(21) Appl. No.: 15/810,389

(22) Filed: Nov. 13, 2017

(30) Foreign Application Priority Data

Jul. 17, 2017 (CN) .......................... 2017 1 0580437

(51) Int. Cl.
*B62B 3/02* (2006.01)
*B62B 3/00* (2006.01)

(52) U.S. Cl.
CPC .............. *B62B 3/025* (2013.01); *B62B 3/001* (2013.01); *B62B 3/002* (2013.01)

(58) Field of Classification Search
CPC ............ B62B 2205/14; B62B 2301/04; B62B 2301/044; B62B 3/02; B60B 33/06
USPC .............................. 280/651, 43.15, 43.16, 38
See application file for complete search history.

(56) References Cited

U.S. PATENT DOCUMENTS

| | | | | |
|---|---|---|---|---|
| 4,796,909 A * | 1/1989 | Kirkendall | ................. | B62B 3/02 180/906 |
| 5,772,222 A * | 6/1998 | Sim | .......................... | B62B 3/02 280/30 |
| 6,491,318 B1 * | 12/2002 | Galt | .......................... | B62B 3/02 280/42 |
| 6,733,026 B1 * | 5/2004 | Robberson | ................ | B62B 3/02 280/30 |
| 6,845,991 B1 * | 1/2005 | Ritucci | .................... | B62B 3/007 280/30 |
| 8,011,686 B2 * | 9/2011 | Chen | ....................... | B62B 3/007 280/651 |
| 8,388,015 B2 * | 3/2013 | Chen | ....................... | B62B 3/007 280/642 |
| 8,973,940 B2 * | 3/2015 | Chen | ......................... | B62B 3/02 280/35 |
| 9,056,621 B1 * | 6/2015 | Jin | .......................... | B62B 3/027 |
| 9,073,564 B2 * | 7/2015 | Yang | ........................ | B62B 3/02 |
| 9,085,311 B1 * | 7/2015 | Chen | ....................... | B62B 3/007 |
| 9,101,206 B1 * | 8/2015 | Chen | ....................... | B62B 3/007 |
| 9,145,154 B1 * | 9/2015 | Horowitz | ............... | B62B 3/025 |
| 9,327,749 B2 * | 5/2016 | Young | ...................... | B62B 3/02 |
| 9,440,668 B1 * | 9/2016 | Chen | ....................... | B62B 3/02 |
| 9,469,324 B2 * | 10/2016 | Bowman | ................ | B62B 5/082 |
| 9,580,095 B2 * | 2/2017 | Vargas, II | ............... | B62B 3/02 |

(Continued)

*Primary Examiner* — Jeffrey J Restifo
(74) *Attorney, Agent, or Firm* — Buchanan Ingersoll & Rooney PC

(57) ABSTRACT

A multi-functional folding cart including a folding cart body with a cloth pocket for containing articles. One end of the folding cart body is movably connected with a handle. A transverse rod and a fixing rod are arranged on the front and rear ends of a bottom of the folding cart body. Two wheels are located on the front end and two wheels are located on the rear end of the bottom of the folding cart body. Each of the wheels is provided with a trundle fixing frame. A stopping part and a rotating shaft are arranged on the top of the trundle fixing frame on the rear end of the bottom of the folding cart body. The rotating shaft connects the trundle fixing frame with the fixing rod. The trundle fixing frame can rotate around the rotating shaft to perform folding.

8 Claims, 5 Drawing Sheets

(56) References Cited

U.S. PATENT DOCUMENTS

| | | | |
|---|---|---|---|
| 9,623,890 B1* | 4/2017 | Horowitz | B62L 3/022 |
| 9,738,298 B1* | 8/2017 | Yang | B62B 3/025 |
| 9,771,093 B2* | 9/2017 | Horowitz | B62B 3/025 |
| 9,855,962 B1* | 1/2018 | Chen | B62B 3/022 |
| 2010/0156069 A1* | 6/2010 | Chen | B62B 3/007 |
| | | | 280/639 |
| 2015/0145224 A1* | 5/2015 | Zhu | B62B 3/025 |
| | | | 280/42 |

* cited by examiner

MULTI-FUNCTIONAL FOLDING CART

TECHNICAL FIELD

The present invention belongs to the technical field of tool trolleys, and particularly relates to a multi-functional folding cart.

BACKGROUND

Folding trolleys are widely used in many places for transporting groceries, pets, gardening articles and the like. The existing folding cart generally has one handle and four wheels as well as a folding cart body and a cloth pocket for containing articles. The trolley may be a multi-functional trolley, can serve as a station wagon, and can also transport articles to seaside or any place. As the folding cart, one of the most important considerations is that the folding cart can be folded and stored when not used, and no large space is occupied. Therefore, in current production of domestic factories, to realize folding and storage, one structure is as follows: two narrow rotating wheels (front wheels) are adopted; a trundle fixing frame of the two rotating wheels is welded on a trolley body; and a trundle fixing frame of two fixing wheels (rear wheels) is also directly welded and fixed to the trolley body. Because treads of the wheels are narrow, folding can be realized. Moreover, after folding, the four wheels are on one straight line. But this structure has a disadvantage because the wheels are narrow, and so the stability is poor and the trolley is easy to roll over. Moreover, the trolley is not suitable for use in sandy beaches and is easy to fall into sand. Another structure is as follows: to enable the trolley to be suitable for use in the sandy beaches, wide rotating wheels are adopted. After the wheels are widened, to realize full folding, a method for sliding the trundle fixing frame of two fixing wheels is adopted for achieving a folding effect. However, this method may affect the normal use of the trolley. Because the trundle fixing frame needs to successfully slide, a certain gap must be kept. Moreover, the fixing wheels are oblique. In this way, two fixing wheels are not firm during operation, thereby affecting the loading capacity. Moreover, in a slide process, an angle needs to be regulated continuously, thereby wasting time, causing instability in use and easily damaging the trundle fixing frame. The trundle frame may be abraded due to long-term repeated slide, thereby damaging the trolley, affecting the normal use, injuring the user and affecting product reputation. Therefore, the problem to be addressed by this disclosure involves more efficiently folding the folding cart that adopts wide wheels.

SUMMARY

This application describes a multi-functional folding cart. The structure of the trundle fixing frame of the fixing wheels is improved to rotate the trundle fixing frame, thereby realizing full folding of the folding cart, increasing stability, firmness and safety of the trolley, solving abrasion and damage to the trundle frame and prolonging service life of the trolley.

To help address the above described technical problem, this application discloses:

A multi-functional folding cart comprises a folding cart body, wherein a cloth pocket for containing articles is arranged in the folding cart body; one end of the folding cart body is movably connected with a handle; a transverse rod and a fixing rod are arranged on a front end and a rear end of a bottom of the folding cart body; a wheel device is arranged on the fixing rod; the wheel device comprises two wheels located on the front end of the bottom of the folding cart body and two wheels located on the rear end of the bottom of the folding cart body; each of the wheels is provided with a trundle fixing frame, wherein a stopping part and a rotating shaft are arranged on the top of the trundle fixing frame on the rear end of the bottom of the folding cart body; the rotating shaft connects the trundle fixing frame with the fixing rod; and the trundle fixing frame can rotate around the rotating shaft to realize full folding of the folding cart. The full folding herein means that the folding of the trolley mainly depends on the folding of the trolley body. In the folding process of the folding cart body, after the fixing wheels rotate inwards, the interference of the fixing wheels and the steering wheels is avoided and the full folding of the trolley can be realized so as to minimize an occupied space.

Further, the two wheels on the front end of the bottom of the folding cart body are steering wheels, and the two wheels on the rear end of the bottom of the folding cart body are fixing wheels.

Further, the rotating shaft is located on the inner side of the trundle fixing frame. The inner side herein is described relative to the trolley body in a normal use state of the trolley. In this way, after the two fixing wheels rotate around the rotating shaft by 180 degrees, the folding cart is fully folded and is in a final state that the two fixing wheels are located between the two steering wheels side by side.

Further, the stopping part is located on the outer side of the trundle fixing frame. Similarly, the outer side herein is described relative to the trolley body in the normal use state of the trolley.

Further, the stopping part comprises a base; at least one clamping jaw is arranged on the base; a groove is arranged at one side of the base; in a normal use state of the trolley, the upper end of the clamping jaw is abutted against the transverse rod on the bottom of the folding cart body; and in a folding state of the trolley, the fixing rod on the bottom of the folding cart body is clamped into the groove of the base. The stopping part ensures that the trundle fixing frame can only rotate by 180 degrees at most. In the use state, the stopping part is located on the outer side of the rotating shaft. In the folding state, the stopping part is located on the inner side of the rotating shaft. The stopping part performs a fixation effect in two states.

Further, the stopping part integrally adopts a plastic piece.

Further, the base of the stopping part is fixedly connected with the trundle fixing frame through a rivet.

Further, the steering wheels are universal wheels.

Concrete operation and use are as follows below.

When the trolley is used, the trundle fixing frame of the fixing wheels rotates to the largest degrees so that the upper ends of the clamping claws of the stopping part are clamped on the transverse rod at the bottom of the trolley, thereby ensuring that trundles are firm in use. Such structure ensures that four wheels of the trolley are fully distributed on four corners of the trolley, thereby increasing stability of the trolley. Moreover, in the use process, because the fixing wheels are not installed obliquely, the bearing force is vertical force and loading capacity is increased.

After use, when the trolley is folded, the rear end of the trolley is slightly lifted to unlock the stopping part, i.e., the clamping claws of the stopping part leave the transverse rod at the bottom of the trolley. The trundle fixing frame of the fixing wheels is seized by a hand; the trundle fixing frame is rotated inwards by 180 degrees in one step; and the groove in the base of the stopping part is clamped on the fixing rod at the bottom of the trolley, thereby ensuring that the trolley is completely folded and saving the space during storage.

On the basis of the existing folding cart structure, by changing the trundle fixing frame of the fixing wheels and adding the stopping part on the trundle fixing frame, the disclosure realizes (i.e., effectuates) trolley folding through slide of the trundle fixing frame in the prior art.

The fixing frame of the fixing wheels of the folding cart can rotate, thereby avoiding an interference problem of the fixing wheels and the steering wheels after trolley folding and also realizing the maximum folding of the trolley. The final folding state is almost that four wheels are on the same row side by side, thereby minimizing an occupied space and facilitating the folding. Because the trundle fixing frame does not need to slide and the trundle fixing frame is blocked under the effect of the stopping part, firmness of the fixing wheels in a travel process is ensured.

The disclosed folding cart helps solve the biggest problem in domestic production of this product, ensure normal folding of the trolley, ensure use performance of the trolley, realize firmness and stability, save operation time, improve carrying capacity of the trolley, enhance safety of users in use and satisfy safety requirements of product quality.

Compared with the prior art, the disclosed folding cart may have the following advantages and positive effects:

1. The normal folding of the trolley is ensured; rotation is realized in one step; the folding time is saved; and folding operation is simpler.

2. The trundle frame can be firmly fixed in use, and stability of the trolley is increased.

3. Because firmness and stability of the trolley are increased, safety of the user is increased in use and the service life of the trolley is prolonged.

4. The loading capacity is increased. On the premise of using the same material, the loading capacity is increased from the original 60 kg to 80-100 kg.

5. The trolley is beautiful, high in grade, and more concise in production.

6. Production quality is enhanced and safety requirements of product quality are satisfied.

A series of simplified concepts are introduced into the summary, and will be further described in detail in detailed description. The summary is not intended to define key features and necessary technical features of technical solutions to be protected, and not intended to determine the protection scope of the technical solutions to be protected.

Advantages and features of the disclosed folding cart will be described below in detail in combination with drawings.

DESCRIPTION OF DRAWINGS

The disclosure of this application will be further described below in combination with drawings and embodiments. In the figures.

DETAILED DESCRIPTION

To make the purpose, the technical solution and the advantages of the present application more clear, the detailed description below is to be understood in combination with the drawings and the embodiments. It should be understood that embodiments described herein are only used for explaining the disclosed folding cart, not used for limiting the present invention.

In the following description, many specific details are given to provide more thorough understanding. However, for those skilled in the art, apparently, the inventive folding cart can be implemented without one or more of the details. In other examples, to avoid confusion with the disclosed folding cart, some technical features known in the field are not described.

A detailed structure will be proposed in the following description. Implementation of the inventive folding cart is not limited to special details known to those skilled in the art. Preferred embodiments are described below in detail. However, besides the detailed description, the disclosed folding cart can also have other embodiments.

The embodiments of the present application will be described below in detail in combination with the drawings.

Figure 1:
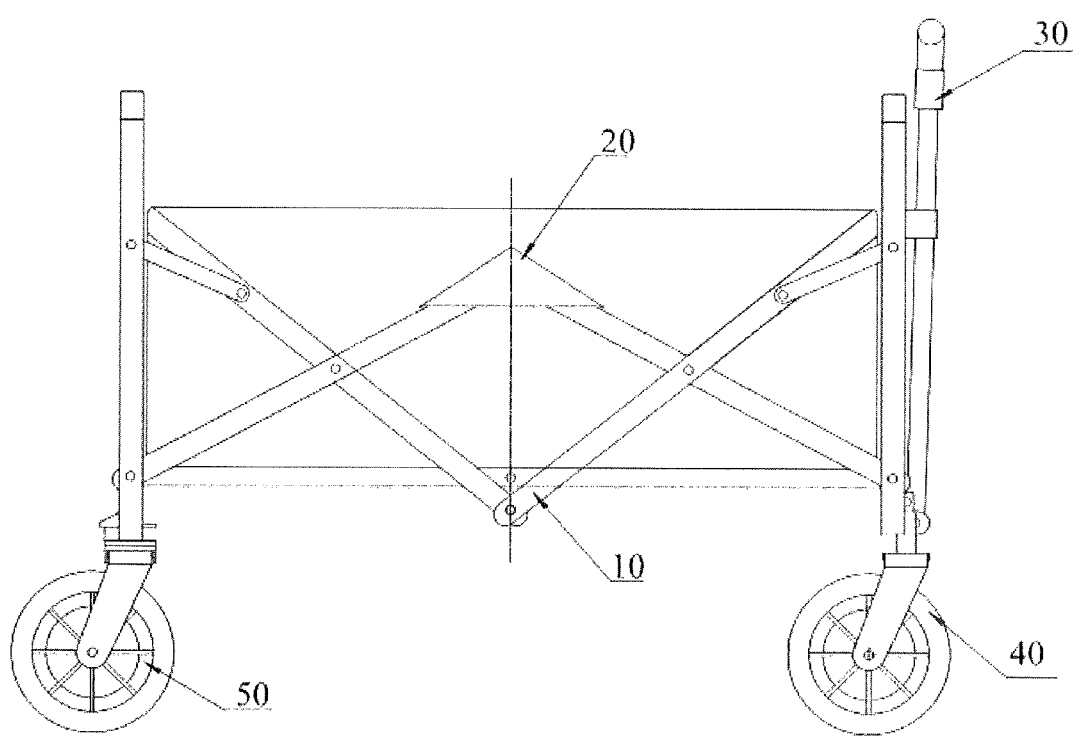
FIG. 1 is a side view of a multi-functional folding cart (use state)
Figure 2:
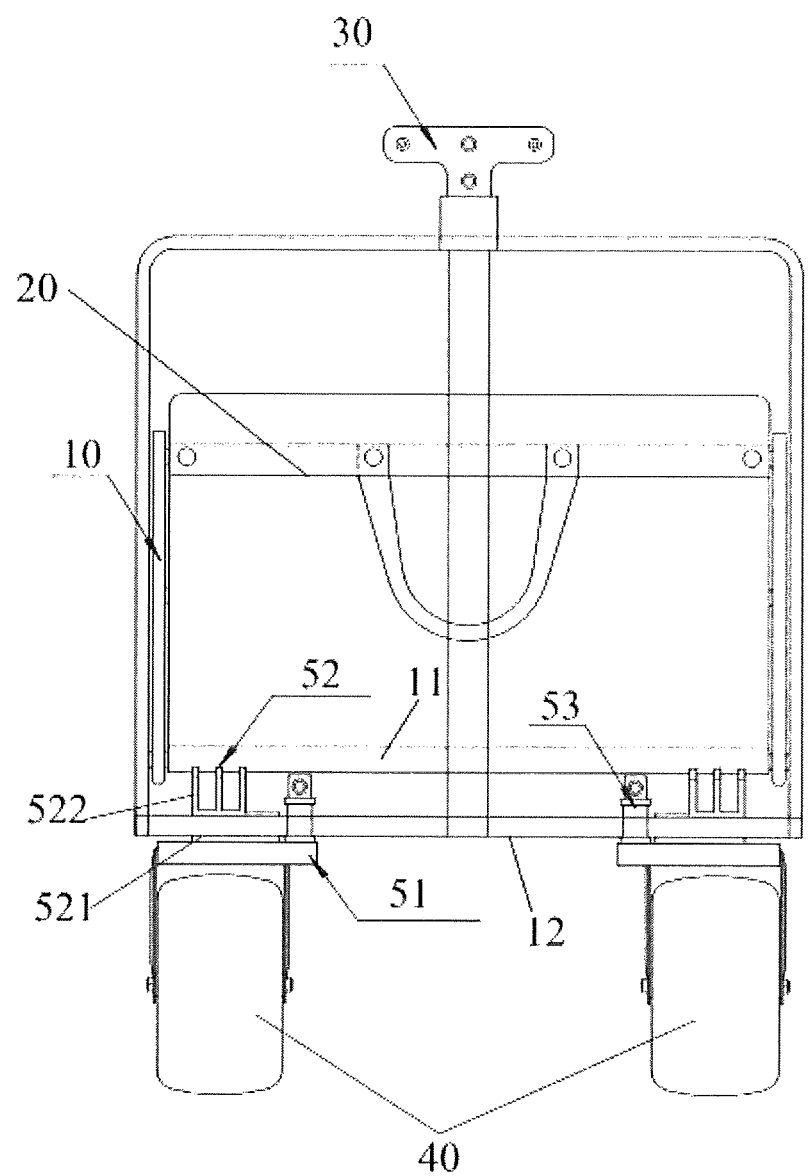
FIG. 2 is a back view of a multi-functional folding cart (use state)
Figure 3:
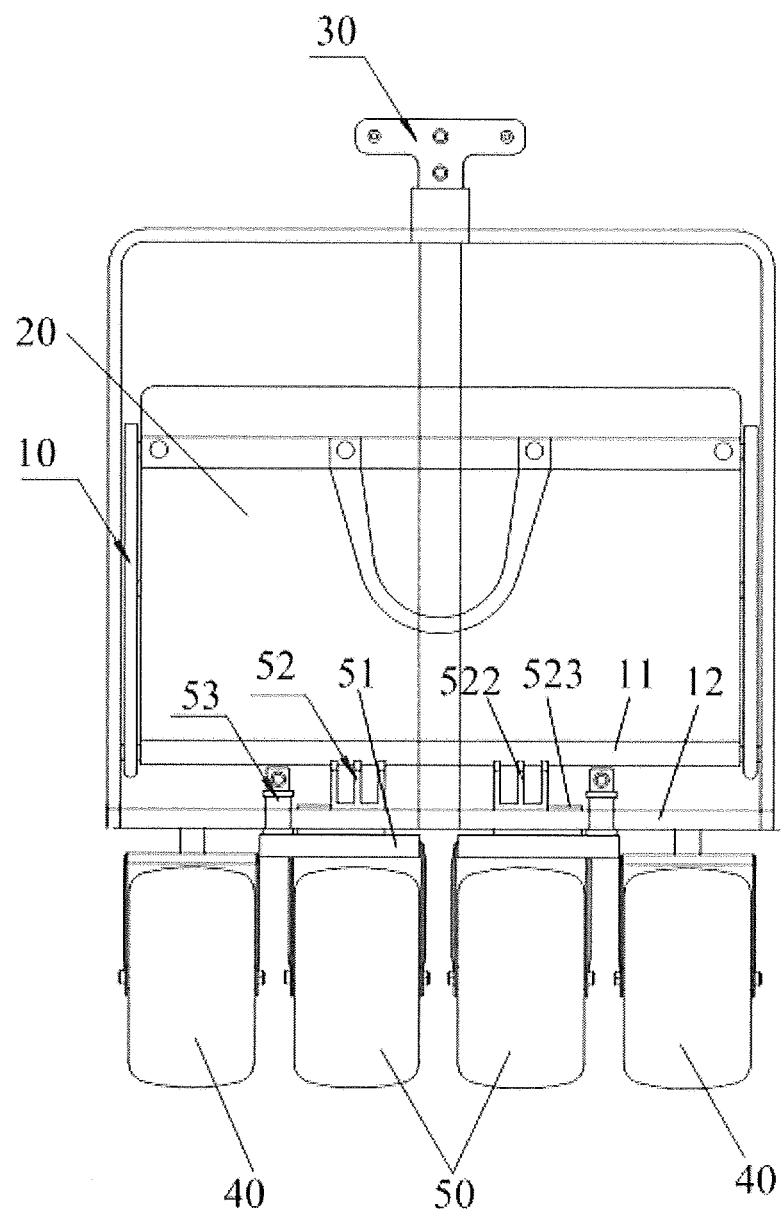
FIG. 3 is a back view of a multi-functional folding cart (final folding state)

FIG. 1 to FIG. 3 show structural schematic diagrams of one specific embodiment of a multi-functional folding cart. The multi-functional folding cart comprises a folding cart body 10, wherein a cloth pocket 20 for containing articles is arranged in the folding cart body 10; one end of the folding cart body 10 is movably connected with a handle 30; a transverse rod 11 and a fixing rod 12 are arranged on a front end and a rear end of a bottom of the folding cart body 10; a wheel device is arranged on the fixing rod 12; the wheel device comprises two universal wheels 40 located on the front end of the bottom of the folding cart body 10 and two fixing wheels 50 located on the rear end of the bottom of the folding cart body 10; and each of the fixing wheels 50 is provided with a trundle fixing frame 51.

As shown in FIG. 2 and FIG. 3, a stopping part 52 and a rotating shaft 53 are arranged on the top of the trundle fixing frame 51; and the trundle fixing frame 51 can rotate around the rotating shaft 53 to realize folding of the folding cart. In a normal use state, the rotating shaft 53 is located on an inner side of the trundle fixing frame 51, and the stopping part 52 is located on an outer side of the trundle fixing frame 51. In this way, after the two fixing wheels 50 rotate around the rotating shaft by 180 degrees, the folding cart is fully folded and is in a final state that the two fixing wheels 50 are located between the two steering wheels 40 side by side.

Figure 4:
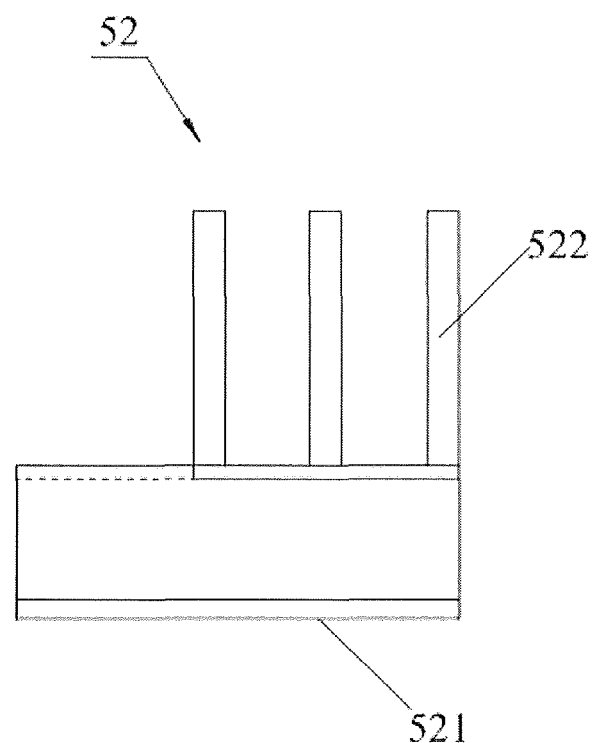
FIG. 4 is a main view of a stopping part.
Figure 5:
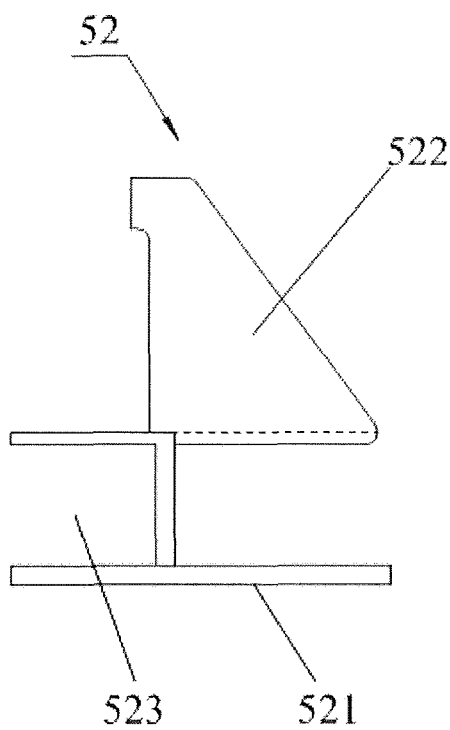
FIG. 5 is a side view of a stopping part.
Figure 6:
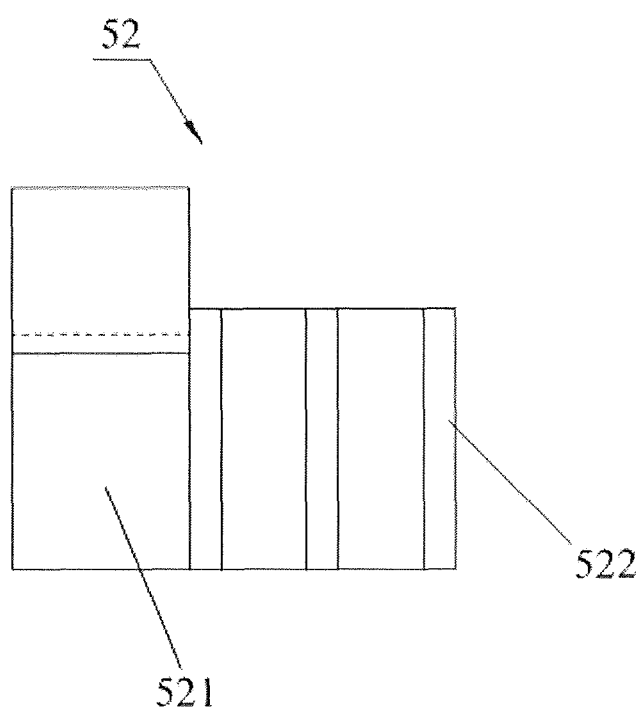
FIG. 6 is a top view of a stopping part.

As shown in a three-view diagram of the stopping part in FIG. 4 to FIG. 6, the stopping part 52 integrally adopts a plastic piece and is formed by integral injection molding. Through adoption of the plastic piece, elasticity is good and structural strength is also satisfied. The stopping part 52 comprises a base 521. Three clamping jaws 522 are arranged on the base 521. One side of the clamping jaws 522 is a bevel. A groove 523 is formed at one side of the base 521. An opening direction of the groove 523 backs to one side at which the clamping jaws are arranged. The base 521 of the stopping part 52 is fixedly connected with the top surface of the trundle fixing frame 51 through a rivet. The transverse rod 11 is arranged on the front end and the rear end of the bottom of the folding cart body 10. In the normal use state of the trolley, the upper ends of the clamping jaws 522 are abutted against the transverse rod 11 on the bottom of the folding cart body 10. In a folding state of the trolley, the fixing rod 12 on the bottom of the folding cart body is clamped into the groove 523 of the base 521. The stopping part 52 ensures that the trundle fixing frame 51 can only rotate by 180 degrees at most. In the use state, the stopping part 52 is located on the outer side of the rotating shaft 53

(as shown in FIG. 2). In the folding state, the stopping part 52 is located on the inner side of the rotating shaft 53 (as shown in FIG. 3). The stopping part performs a fixation effect in two states. Concrete operation and use are as follows:

As shown in FIG. 2, when the trolley is used, the trundle fixing frame 51 rotates to the largest degrees so that the upper ends of the clamping claws 522 of the stopping part 52 are clamped on the transverse rod 11 at the bottom of the trolley, thereby ensuring that the fixing wheels 50 is firm in use.

As shown in FIG. 3, after use, when the trolley is folded, the trundle fixing frame 51 is seized by a hand; the trundle fixing frame 51 is rotated inwards by 180 degrees; and the fixing rod 12 on the bottom of the folding cart body is clamped into the groove 523 of the base 521. In this way, full folding of the trolley is ensured and the space is saved during storage. At this moment, four wheels are almost on the same row.

On the basis of the existing folding cart structure, by changing the trundle fixing frame of the fixing wheels to rotate the trundle fixing frame and adding the stopping part on the trundle fixing frame, the disclosed folding cart helps address a series of problems caused by realizing trolley folding through slide of the trundle fixing frame in the prior art. The fixing frame of the fixing wheels of the folding cart can rotate, thereby avoiding an interference problem of the fixing wheels and the steering wheels after trolley folding and also realizing the maximum folding of the trolley. The final folding state is almost that four wheels are on the same row side by side, thereby minimizing an occupied space and facilitating the folding. Because the trundle fixing frame does not need to slide and the trundle fixing frame is blocked under the effect of the stopping part, firmness of the fixing wheels in a travel process is ensured.

The disclosed folding cart helps ensure reliable folding performance of the trolley, realize firm fixation of the trundle frame, increase stability of the trolley, prolong service life of the trolley and protect safety of the user.

The above description involves preferred embodiments of the present invention, not intended to limit the present invention in other forms. Any of those skilled in the art familiar with field may change or vary the embodiments through the technical contents disclosed above into equivalent embodiments with equivalent modification. However, any simple amendment, equivalent change and variation made to the above embodiments according to the technical essence of the present invention without departing from contents of technical solutions of the present invention shall still belong to the protection scope of the technical solutions of the present invention.

The invention claimed is:

1. A multi-functional folding cart, comprising:
    a folding cart body comprising a cloth pocket for containing articles, the folding cart body possessing a front end, a rear end, and a bottom;
    a handle movably connected to one of the front end and the rear end of the folding cart body;
    a transverse rod arranged on the front end of the bottom of the folding cart body;
    a fixing rod arranged on the rear end of the bottom of the folding cart body;
    a wheel device arranged on the fixing rod, the wheel device comprising two wheels located on the front end of the bottom of the folding cart body and two wheels located on the rear end of the bottom of the folding cart body;
    each of the wheels of the wheel device being provided with a trundle fixing frame;
    a stopping part and a rotating shaft arranged on a top of the trundle fixing frame on the rear end of the bottom of the folding cart body, the rotating shaft connecting the trundle fixing frame with the fixing rod; and
    the trundle fixing frame being rotatable around the rotating shaft to effectuate folding of the folding cart.

2. The multi-functional folding cart according to claim 1, wherein the two wheels on the front end of the bottom of the folding cart body are steering wheels, and the two wheels on the rear end of the bottom of the folding cart body are fixing wheels.

3. The multi-functional folding cart according to claim 2, wherein the steering wheels are universal wheels.

4. The multi-functional folding cart according to claim 1, wherein
    the trundle fixing frame possesses an outer side and an inner side, and
    the rotating shaft is located on the inner side of the trundle fixing frame.

5. The multi-functional folding cart according to claim 4, wherein the stopping part is located on the outer side of the trundle fixing frame.

6. The multi-functional folding cart according to claim 5, wherein
    the stopping part comprises a base;
    at least one clamping jaw is arranged on the base;
    a groove is arranged at one side of the base;
    the folding cart is collapsible from a normal state to a folding state;
    in the normal use state of the folding cart, an upper end of the clamping jaw is abutted against the transverse rod on the bottom of the folding cart body; and
    in the folding state of the folding cart, the fixing rod on the bottom of the folding cart body is clamped into the groove of the base.

7. The multi-functional folding cart according to claim 6, wherein the base of the stopping part is fixedly connected with the trundle fixing frame through a rivet.

8. The multi-functional folding cart according to claim 6, wherein the stopping part integrally adopts a plastic piece.

* * * * *